United States Patent
Hsiao

(10) Patent No.: US 6,697,893 B2
(45) Date of Patent: Feb. 24, 2004

(54) LINE CONCENTRATOR WITH STORAGE FUNCTION

(75) Inventor: Wen-Hsiang Hsiao, Taipei (TW)

(73) Assignee: WEM Technology Inc., Taipei (TW)

( * ) Notice: Subject to any disclaimer, the term of this patent is extended or adjusted under 35 U.S.C. 154(b) by 54 days.

(21) Appl. No.: 10/145,730

(22) Filed: May 16, 2002

(65) Prior Publication Data
US 2003/0217207 A1 Nov. 20, 2003

(51) Int. Cl.⁷ .............................. G06F 3/00; G06F 13/00
(52) U.S. Cl. ..................... 710/72; 709/238; 709/245; 709/249; 370/434; 370/463; 379/333; 379/334
(58) Field of Search .................................. 709/238, 245, 709/249; 370/434, 463; 379/333, 334; 710/72

(56) References Cited

U.S. PATENT DOCUMENTS

| | | | | |
|---|---|---|---|---|
| 4,754,480 A | * | 6/1988 | Mattis et al. ................ | 379/279 |
| 6,154,447 A | * | 11/2000 | Vedder ........................ | 370/244 |
| 6,493,767 B1 | * | 12/2002 | Ishida et al. ................. | 709/249 |

* cited by examiner

Primary Examiner—Rehana Perveen
(74) Attorney, Agent, or Firm—Bacon & Thomas, PLLC

(57) ABSTRACT

Of the line concentrator with a storage function, an insertion end to be connected to a connecting port and a housing provided with a plurality of connecting ports compose its main body. The housing has therein a serially connected line concentrating circuit and a flash memory storage circuit being integrated therein. A line concentrating and distributing control loop in the serially connected line concentrating circuit is connected with a serial connecting-line interface in the flash memory storage circuit to form integration of the serially connected line concentrating circuit with the flash memory storage circuit. So that the entire line concentrator can afford expanding and connecting of other peripheral implements by taking advantage of the provision of the connecting ports, and can form a personal disk for storing data by taking advantage of the memories in the flash memory storage circuit.

4 Claims, 5 Drawing Sheets

LINE CONCENTRATOR WITH STORAGE FUNCTION

BACKGROUND OF THE INVENTION

1. Field of the invention

The present invention is related to a line concentrator with a storage function, and especially to a line concentrator able to be used to expand a connecting port, and used to store data, it can save the cost of purchasing another personal storage device and another line concentrator, and can largely reduce the space occupied by a personal storage device in favor of expanding for other peripheral implements of a computer mainframe.

2. Description of the Prior Art

Generally, a personal computer mainframe is provided, in addition to the basic operational construction, with various connecting ports; so that a user can be expanded for the peripheral implements. And by virtue of nonstop advancing of the technique of transmission, peripheral implements using various transmitting interfaces have been developed; thereby, the problem derived from different types of connecting ports or the limitation of expanding of functions of a computer mainframe derived from insufficient amount of connecting ports exists. Therefore, there have been universal serial line-connecting distributors used to extend the line of a single connecting port to a line concentrator with multiple lines of connecting ports to expand the amount and type of the connecting port, the thereby to increase the functional expanding of a computer mainframe.

And more, by the fact that desktop computers or notebooks mostly are developed toward the designing aim of light weight and small volume, the connecting ports of them are arranged in a crowded mode, thereby, the spaces of the connecting ports can only afford connecting of a normal plug (connector); in this mode, when a line concentrator is inserted in such a connecting port on a computer mainframe, the volume of the line concentrator obscures a neighboring connecting port to make the latter lose its function. Moreover, some exteriorly connected auxiliary peripheral implements such as a personal storage device mostly also have their related circuits directly connected by means of plugs for the sake of convenience of carrying, the appearances of the plugs are larger than normal plugs to thereby hinder them from being arranged side by side with other connectors to be inserted into some mutually neighboring connecting ports. This makes a limitation against use of other peripheral implements.

SUMMARY OF THE INVENTION

In view of the above statement, the primary object of the present invention is to provide a line concentrator with a storage function, whereof, an insertion end to be connected to a connecting port and a housing provided with a plurality of connecting ports compose its main body. The housing has therein a serially connected line concentrating circuit and a flash memory storage circuit being integrated therein. A line concentrating and distributing control loop in the serially connected line concentrating circuit is connected with a serial connecting-line interface in the flash memory storage circuit to form integration of the serially connected line concentrating circuit with the flash memory storage circuit. So that the entire line concentrator can afford expanding and connecting of other peripheral implements by taking advantage of the provision of the connecting ports, and can form a personal disk for storing data by taking advantage of the memories in the flash memory storage circuit.

The present invention will be apparent after reading the detailed description of the preferred embodiment thereof in reference to the accompanying drawings.

DETAILED DESCRIPTION OF THE PREFERRED ENIBODIMENT

Figure 1:
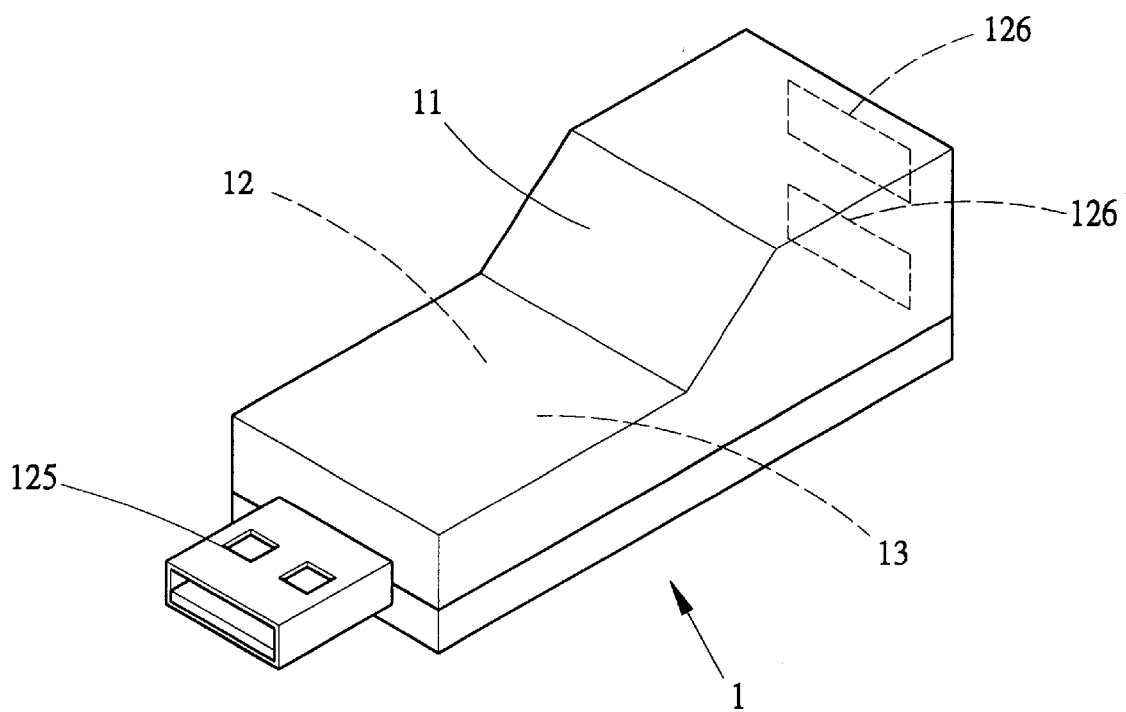
FIG. 1 is a perspective view showing the appearance of a line concentrator of the present invention.

Referring to FIGS. 1, the line concentrator 1 with a storage function of the present invention is comprised mainly of an insertion end 125 for connecting with a connecting port and a housing 11 provided with a plurality of connecting ports 126, these two parts compose the main body thereof. The line concentrator 1 has in the housing 11 thereof a serially connected line concentrating circuit 12 and a flash memory storage circuit 13 being integrated therein. The insertion end 125 and the connecting ports 126 are connected with the serially connected line concentrating circuit 12 in the housing 11.

Figure 2:
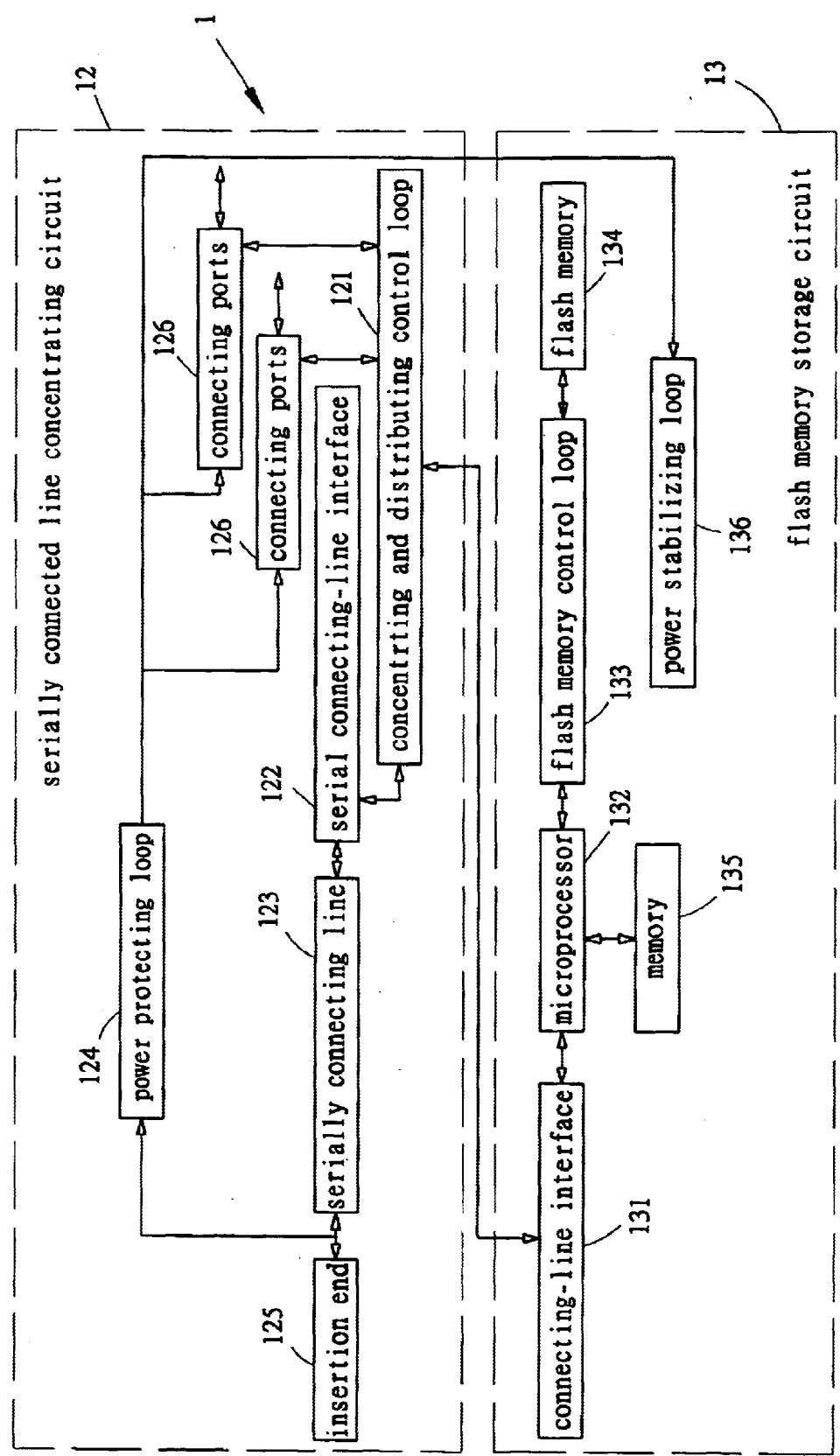
FIG. 2 is a schematic drawing showing the circuit structure in the line concentrator of the present invention.
Figure 5:
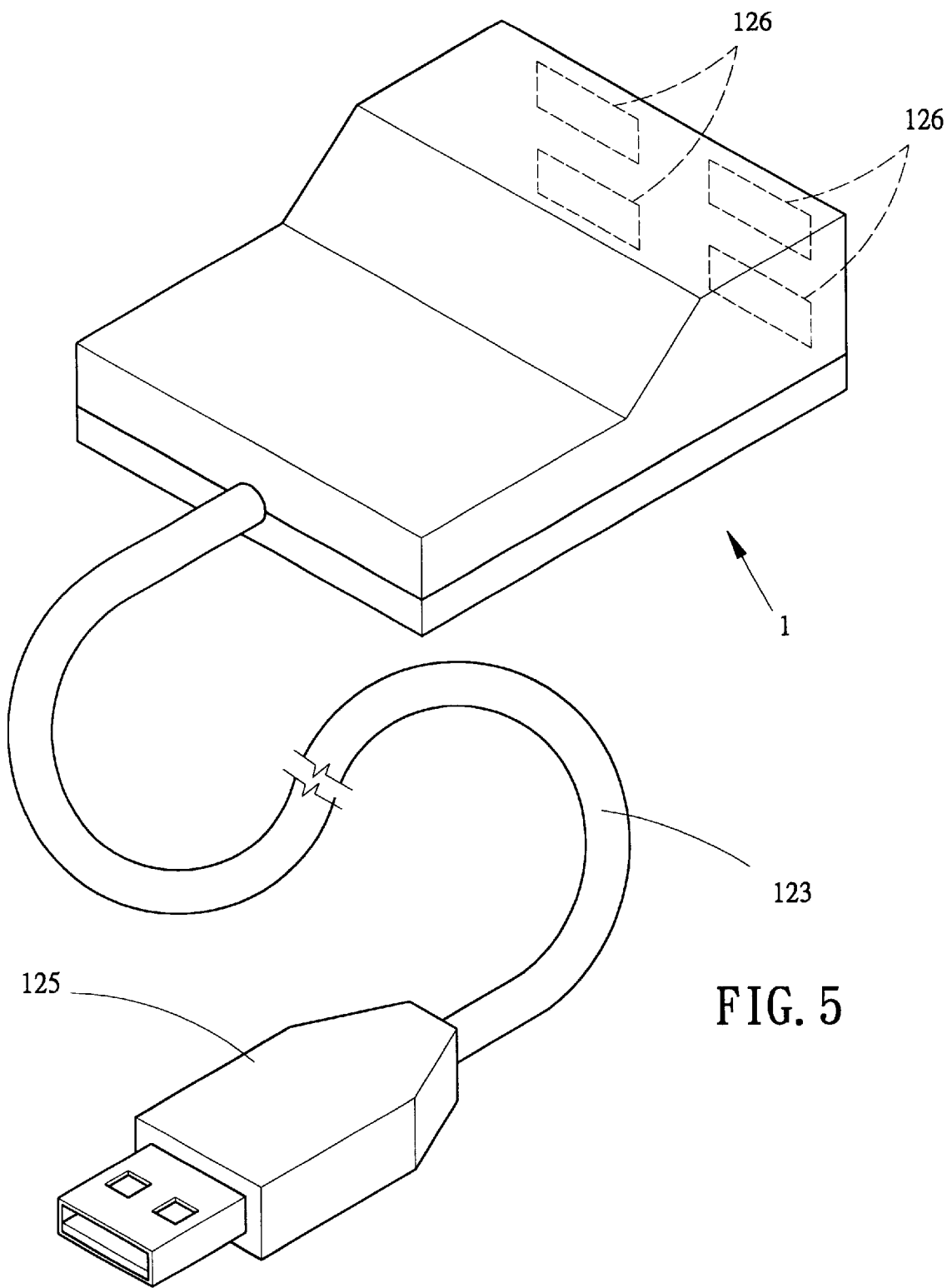
FIG. 5 is a perspective view showing the appearance of another embodiment of line concentrator of the present invention.

Referring to FIG. 2, the serially connected line concentrating circuit 12 integrates therein a line concentrating and distributing control loop 121, a serial connecting-line interface 122, a serially connecting line 123, a power protecting loop 124 and the insertion end 125 extending to the exterior of the housing 11. It also includes the connecting ports 126 similarly extending to the exterior of the housing 11. The insertion end 125 can be insertion connected with the serially connecting line 123 to form an insertion connector as is shown in FIG. 1, in order that the entire line concentrator 1 can be directly inserted into a connecting port of a computer mainframe for use. Otherwise, as shown in FIG. 5, the serially connecting line 123 is designed to be the type of a signal line, the insertion end 125 thereon is in the form of an insertion connector and provided on the tailing end thereof, so that the entire line concentrator 1 can be inserted into a connecting port of the computer mainframe by taking advantage of the insertion end 125, and the main body of the line concentrator 1 can be located at a suitable position on the periphery of the computer mainframe for use by taking advantage of the extending function of the serially connecting line.

Figure 3:
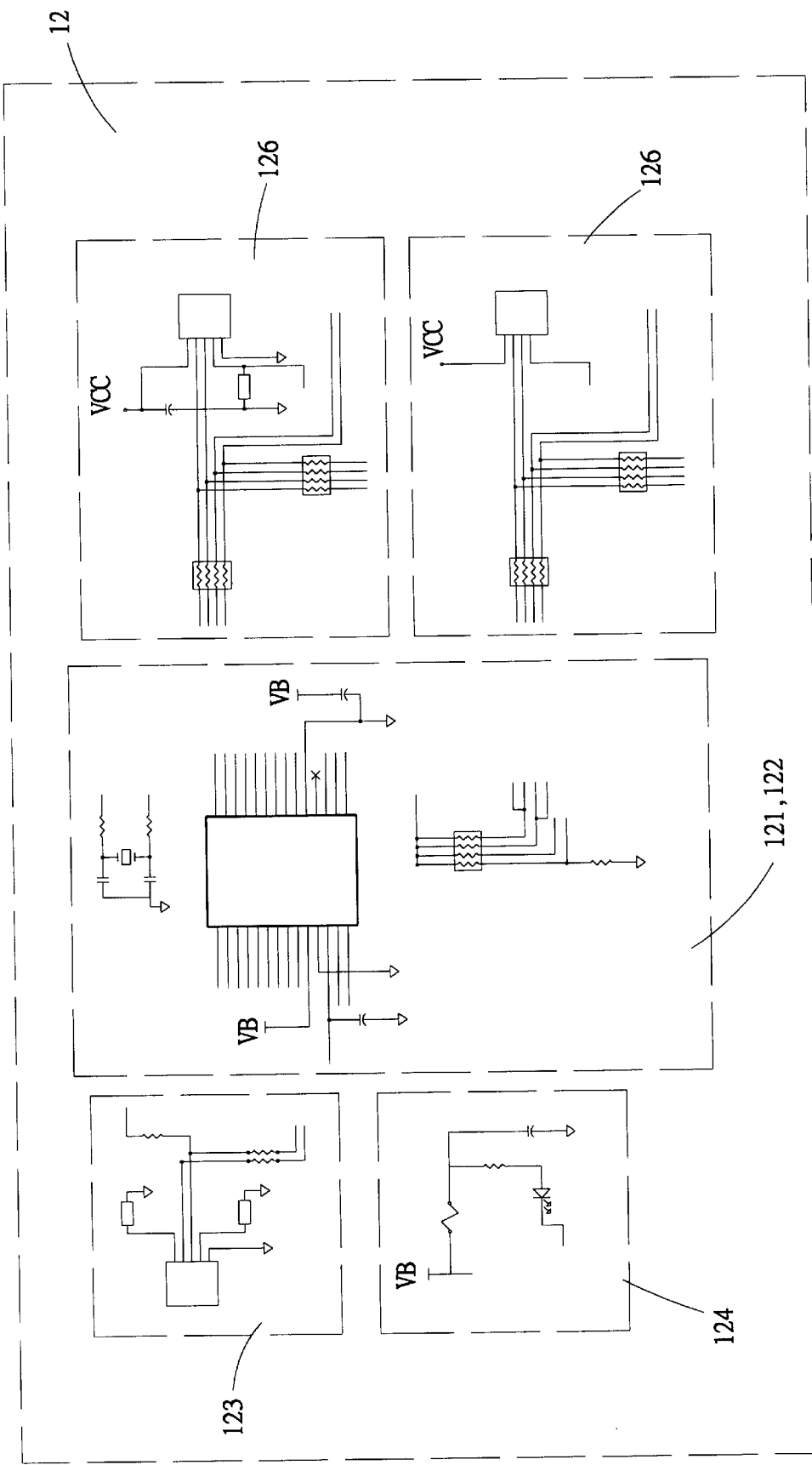
FIG. 3 is a circuit diagram showing allocation of the circuit of a serially connected line concentrating circuit of the present invention.
Figure 4:
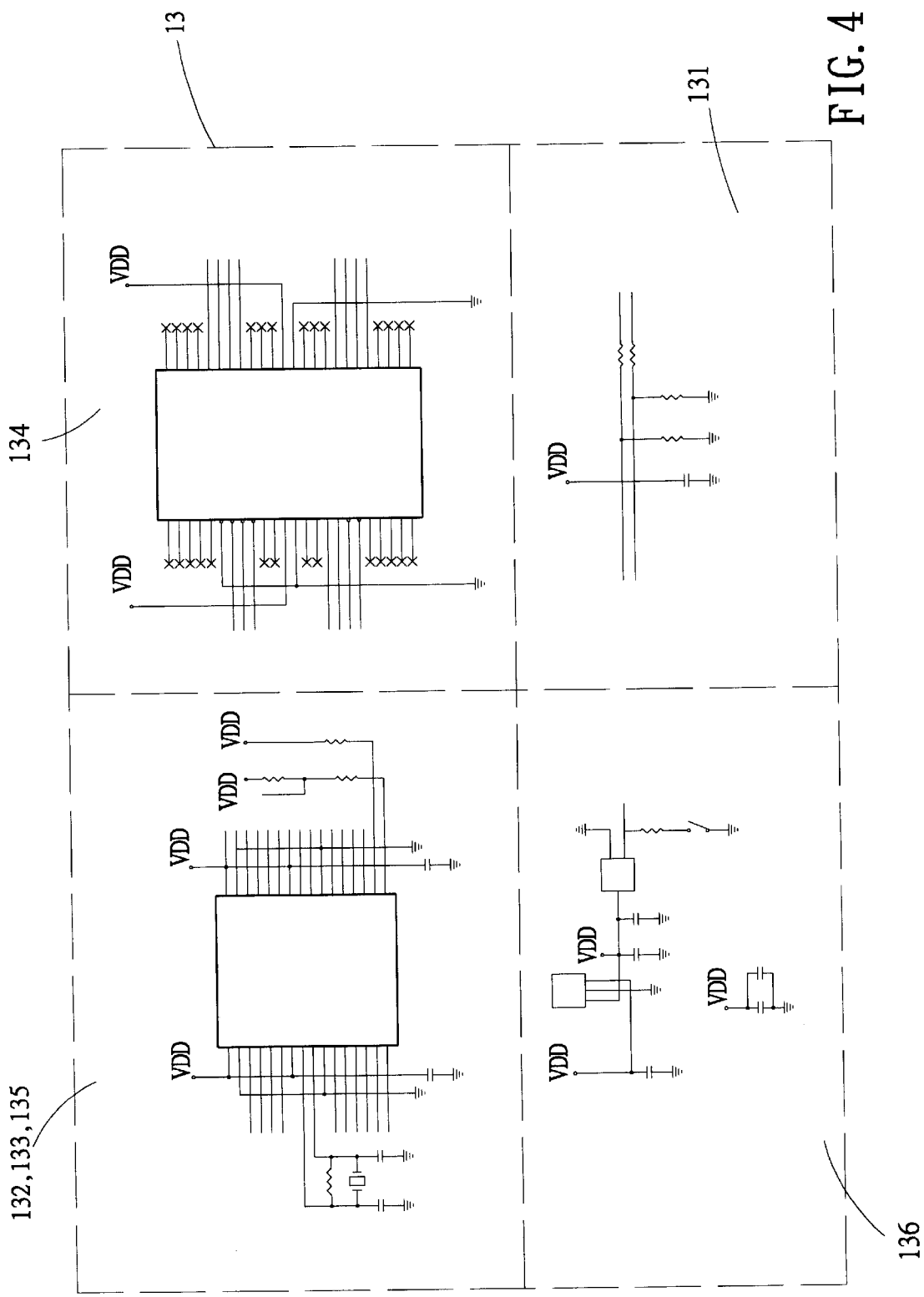
FIG. 4 is a circuit diagram showing allocation of the circuit of a flash memory storage circuit of the present invention.

The flash memory storage circuit 13 has a serial connecting-line interface 131, a microprocessor 132, a flash memory control loop 133, a flash memory 134, a memory 135 and a power stabilizing loop 136 integrated therein. Referring simultaneously to FIGS. 2, 3 and 4, in the entire line concentrator 1, the line concentrating and distributing control loop 121 of the serially connected line concentrating circuit 12 is connected to the serial connecting-line interface 131 of the flash memory storage circuit 13, and is connected to the attached connecting ports 126, to thereby form integration of the serially connected line concentrating circuit 12 with the flash memory storage circuit 13. And the entire line concentrator 1 can afford expanding and connection for other peripheral implements by taking advantage of the provision of the connecting ports 126, and can form a personal disk for storing data by taking advantage of the memories 135 in the flashmemory storage circuit 13.

The line concentrator with a storage function of the present invention takes the insertion end able to be connected with a connecting port and the housing attached with a plurality of connecting ports as its main body; the housing has a serially connected line concentrating circuit and a flash memory storage circuit integrated therein, so that the entire line concentrator can afford expanding and connection for other peripheral implements by taking advantage of the provision of the connecting ports, and can form a personal disk for use by taking advantage of the memories in the flash memory storage circuit. The present invention largely increases the function as well as applicabilityof andprovides apreferred structureof line concentrator. Having thus described my invention, what I claim as new and desire to be secured by letters patent of the united states are:

What is claimed is:

1. A line concentrator with a storage function, said line concentrator has an insertion end connected to a connecting port and a housing provided with a plurality of connecting ports, said insertion end and said housing together compose the main body of said line concentrator, said housing has therein:

a serially connected line concentrating circuit integrating therein a line concentrating and distributing control loop, a serial connecting-line interface, a serially connecting line and said insertion end extending to the exterior of said housing, said serially connected line concentrating circuit also including said connecting ports similarly extending to the exterior of said housing; and a flash memory storage circuit integrating therein a serial connecting-line interface, a microprocessor, a flash memory control loop, a flash memory, a memory and a power stabilizing loop;

in said line concentrator, said line concentrating and distributing control loop of said serially connected line concentrating circuit is connected to said serial connecting-line interface of said flash memory storage circuit, and is connected to said connecting ports, to thereby form integration of said serially connected line concentrating circuit with said flash memory storage circuit, and said line concentrator is adapted to affording expanding and connection for other peripheral implements by taking advantage of the provision of said connecting ports, and forms a personal disk for storing data by taking advantage of said memories in said flash memory storage circuit.

2. The line concentrator as stated in claim 1, wherein, said serially connected line concentrating circuit and said flash memory storage circuit additionally integrate therein respectively a power protecting loop and a power stabilizing loop.

3. The line concentrator as stated in claim 1, wherein, said insertion end is insertion connected with said serially connecting line to form an insertion connector, in order that said line concentrator is directly inserted into a connecting port of a computer mainframe for use.

4. The line concentrator as stated in claim 1, wherein, said serially connecting line is designed to be the type of a signal line to have said insertion end in the form of an insertion connector provided on the tailing end thereof; so that said line concentrator is adapted to inserting into a connecting port of a computer mainframe by taking advantage of said insertion end, and said main body of said line concentrator is located at a suitable position on the periphery of said computer mainframe for use by taking advantage of the extending function of said serially connecting line.

\* \* \* \* \*